Feb. 8, 1955        H. WHITESELL        2,701,431
WHEEL
Filed Feb. 2, 1954
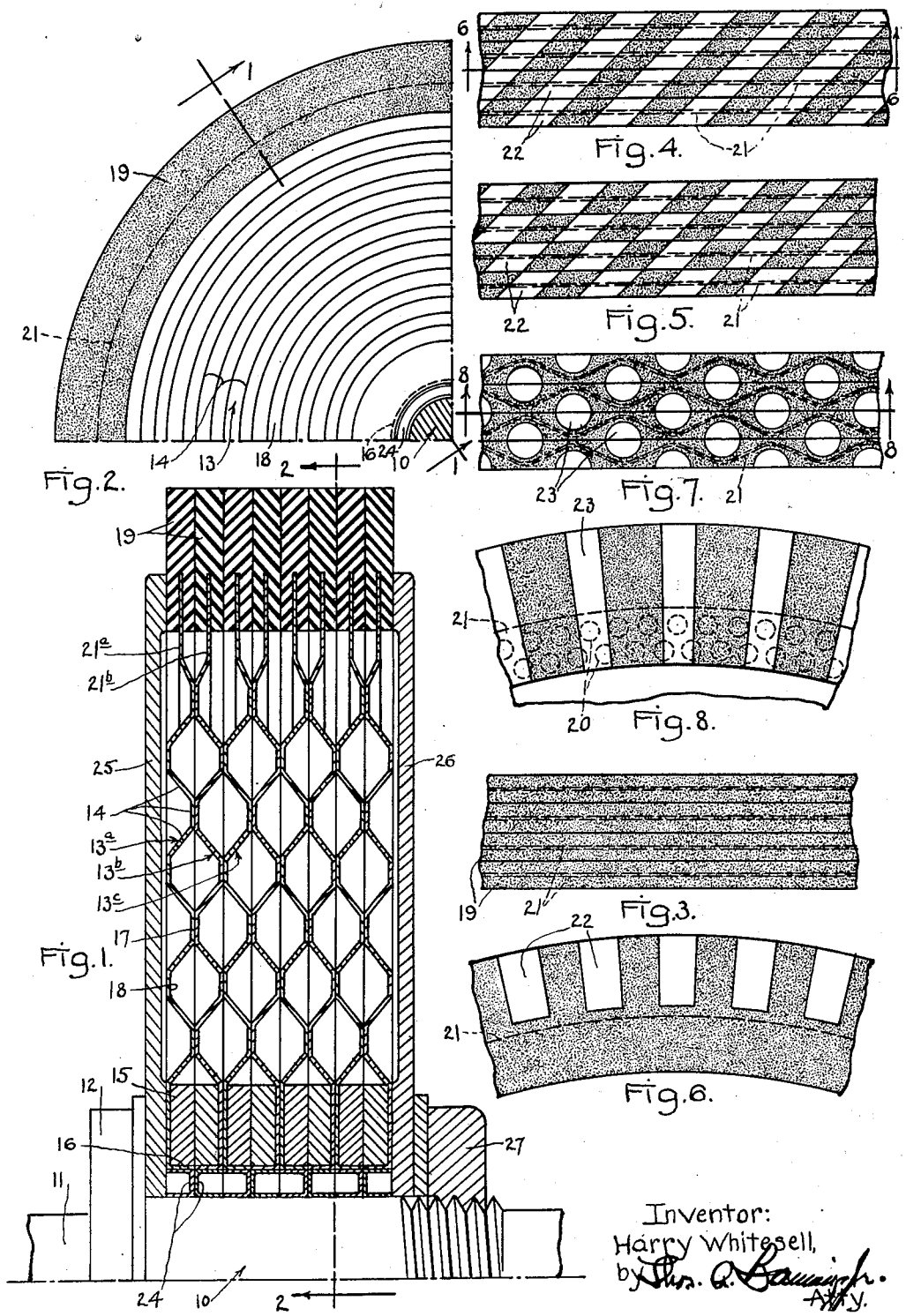
Inventor:
Harry Whitesell,

United States Patent Office 2,701,431
Patented Feb. 8, 1955

2,701,431
WHEEL
Harry Whitesell, Chicago, Ill.

Application February 2, 1954, Serial No. 407,677

16 Claims. (Cl. 51—193)

This invention relates to improvements in wheels. The improved wheels hereinafter disclosed have been devised particularly for use in such operations as polishing and grinding work bodies, and to meet the conditions imposed by such operations, but it will presently appear that said improvements may also be used in wheels intended for other operations not thus specifically mentioned.

Wheels of various sizes are used in presently accepted polishing operations, ranging generally from as small as four inches diameter to as large as sixteen or more inches diameter. Also it is accepted practice to use shafts or arbors of two or three inches diameter as the wheel supports by which the wheels are supported and driven during operation. It is furthermore found desirable to use wheels of varying lengths (along the shaft or axis) depending largely on the size and nature of the work object to be treated. Due to these various sizes of wheel diameters and other operation conditions it has been found necessary for plants to carry on hand a large number of wheels or wheel elements to meet varying conditions from day to day or even from hour to hour of plant or machine operations. This has made it necessary to maintain a large investment in these elements of plant operation, and to likewise incur correspondingly large expenses in maintainance and upkeep of the physical properties. Furthermore, when changing from one wheel size or specification to another it has generally been necessary to completely remove the one wheel and substitute another wheel on the grinding or polishing machine itself. This has made it necessary to have on hand the numerous completely assembled wheels needed to enable such substitutions to be made.

Such polishing operations also require the use of wheels having various specifications of abrasive surfaces, some harder than others, and some of one quality of material and others of other qualities of material. These facts have further greatly aggravated the problems of having available and ready for quick use in each case a wheel of those specifications needed to enable the performance of the intended or specified operations on the work bodies. This and other related conditions have seriously militated against the profitable operation of relatively small plants which are not financially strong enough to carry large investments in such tools. Said conditions have also made excessively large investments necessary even in the case of plants which are able to carry the needed investments, thus requiring much extra space for storage and accommodation of the wheels, etc.

A prime object of my present invention is to produce a sectionalized wheel construction which includes wheel elements which can be assembled together into wheels of various sizes and specifications as to abrasive surfaces, and to enable mounting and use of such wheels on arbors of various sizes as needed to enable use on the driving and supporting machine elements in which such wheels are used and driven. The sectionalizing hereinafter disclosed is such as to enable ready assembly of parts into a wheel of any required or desired length, by the mere addition of further sections to the wheel, and such as to enable ready mounting and use of the so assembled wheel on the arbor or driving element whose size is to be met. These sectionalizations are also such as to enable the mounting and use of sections having abrasive surfaces of the required specifications to comply with the imposed conditions of operation.

A further feature and object of the invention is to enable the assembly of the sections into various combinations and relationships in order to enable provision of abrasive surfaces of different physical forms and specifications other than the material specifications. Thus, for example, it may be desired to provide the peripheral abrading surface of the wheel with irregularities of various designs, such as cross grooves or irregularities, or such as radially extending openings. Or it may be desired that such cross grooves be continuous for the axial length or dimension of the abrading surface, or that they may be discontinuous or of a form in which the joints between the adjoining sections are discontinuous or break joints. Or it may be desired that the grooves extend in direct circular fashion over the abrading length of the wheel, or extend in spiral or other special fashion around the wheel's peripheral surface. The sectionalized wheel construction hereinafter disclosed is such as to lend itself to use in meeting all such conditions as well as other conditions which will suggest themselves to the user of such equipment.

Another and important feature and object of the invention is to provide a wheel construction in which the sections may be formed of pressed steel or other metal, by conventional die forming operations. This will also enable the production of wheels of relatively light weight consistent with their sizes, and at low cost of production. In this connection, it is a further object to so design the sheet metal sections that they may be produced by use of dies of sectionalized form, using few die sections for the production of the smaller wheel size elements, and using additional die sections for the production of the wheel sections for wheels of larger sizes. Thus the fabricating equipment may also be of a nature to require a relatively small investment.

A further feature and object of the invention is to so design these wheel sections as to produce a wheel body of great strength and rigidity when the sections are assembled together. In this connection it is a feature of the invention that each such wheel body section is formed of sheet metal of the special design hereinafter disclosed, and with a corresponding ability to produce the wheel sections at low cost of great stiffness. In this connection it is a further object of the invention to so design and produce such sections that when they are assembled into the wheel structure they may be bonded together into a unitary structure of even greater strength and rigidity than the strengths of the several individual sections combined, thus producing a wheel which will retain its form and accuracy of dimension to a very close tolerance, even when the wheel is of large size.

Specifically, a further and important feature and object of the invention is to produce a polishing wheel having its peripheral surface formed of elastic or yieldable material such as rubber or neoprene, and of a degree of softness to meet polishing specifications and according to the objects to be polished or otherwise treated. To this end the individual sheet metal wheel body sections are provided with peripheral annular elements formed of the rubber or other elastic material, bonded or moulded to such wheel sections and comprising portions of them. When the wheel sections are assembled into the complete wheel structure such peripheral annular elements together provide the wheel's peripheral surface, being the working surface which acts on the work bodies being polished or treated. These peripheral annular elements of the successive wheel sections are bonded together during the wheel assembling operation by suitable cementing or bonding agent, so that when the assembling operation has been completed the peripheral portion and surface of the wheel constitutes a unitary body, the several planes of bond between the successive sections being susbtantially non-apparent to the observer. The bonding together with the sheet metal portions of the wheel sections will also serve to produce a wheel body of great rigidity to support such peripheral portion with that degree of accuracy of support necessary to ensure accurate and uniform running of the wheel during the abrading operations.

When the peripheral portion of the wheel is thus formed of elastic material such as rubber or neoprene, of that degree of softness specified for the operation, upon pressing the work body against such yieldable surface during the running of the wheel it is evident that there will be produced deformity of the elastic material, enabling such material to reach into and produce its polishing operations on surfaces of irregular form. The degree of softness selected for the peripheral portion of the wheel will be determined largely by the form and extent and sharpness of the irregularities of the work body to be thus treated.

A further feature and object of the invention relates to the provision of the form of the peripheral surface itself with irregularities, such as the cross grooves already referred to. Other forms of such irregularities might include cylindrical radially extending openings in the elastic body and of various contours. It is evident that when such radially extending openings are provided in the elastic peripheral portion of the wheel, upon depression of that portion of such elastic wheel which includes such a radial opening the air contained within such radial opening will be trapped and will have to suffer compression with corresponding resistance to the deformation of the elastic wheel periphery unless provision is also made to allow escape of such entrapped air from such radial opening. I have made such provision by carrying the radial openings far enough radially inwardly to communicate with the interior of the assembled wheel. That interior also communicates with numerous other similar radial openings, so that the air trapped in any one or several such radial openings may cross transfer within the wheel body and be thus brought into communication with the external air through other ones of such radial openings. Thus there is no possibility of building up resistance to the normal and expected elastic action of the wheel's periphery by reason of such entrapped bodies of air within radial openings of the elastic peripheral portion of the wheel.

Other objects and uses of the invention will appear from a detailed description of the same, which consists in the features of construction and combinations of parts hereinafter described and claimed.

In the drawing:

Figure 1 shows a longitudinal half section through a typical built up wheel embodying the features of the present invention, the wheel there shown including eight sections, each provided with its peripheral elastic portion or element, and these sections each including several circular corrugations or deformations in the axial direction, and the sections being all mounted on and locked to an arbor;

Figure 2 shows a quarter or quadrant face view of one of the body elements of a wheel section of the form shown in Figure 1, being a section taken on the line 2—2 of Figure 1, looking in the direction of the arrows;

Figure 3 shows a fragmentary portion of the development of the peripheral surface portion of the wheel shown in Figures 1 and 2, showing, however, only four of the eight wheel sections, for purposes of reduction of figure size; and the peripheral portion of the wheel shown in Figure 3 is plain and not provided with any special irregularities, such as grooves or radial openings;

Figure 4 shows a view similar to that of Figure 3, but in the present instance the peripheral wheel portions are provided with cross grooves (that is, grooves which will extend across the wheel section, but in a generally axial direction when the wheel section is assembled into the complete wheel), such cross grooves being formed at an angle of substantially forty-five degrees to the plane normal to the axis of rotation, and the grooves of successive wheel sections registering with each other so that continuous grooves are produced extending in registering fashion from wheel section to wheel section for the length of the wheel measured axially;

Figure 5 shows a view similar to that of Figure 4, but in the present instance the successive sections are so set and locked into the wheel that the grooves of the successive sections "break joints" with each other, thus producing a staggered relationship as clearly shown in this figure; it being noted that the wheel sections used in producing the formations of both Figures 4 and 5 are identical, but such sections are rocked relatively to each other slightly in the one case as compared to the other case;

Figure 6 shows a fragmentary section taken on the line 6—6 of Figure 4, looking in the direction of the arrows; and in this case the grooves are shown as extending inwardly radially only partly through the radial dimension of the elastic portion of the wheel so that "venting" cannot occur to the interior of the wheel body, but since the grooves of the successive wheel sections shown in Figure 4 register with each other it is evident that such venting may occur in a generally axial direction of the wheel, and from section to section until a location is reached beyond the area against which the work body is in contact with the peripheral surface of the wheel;

Figure 7 shows a fragmentary portion of the development of the peripheral surface portion of the wheel shown in Figures 1 and 2, but showing a further modified form of such peripheral wheel portion, such modification consisting in the provision of radially extending openings through each elastic peripheral wheel section portion, such openings thus reaching to the interior of the assembled wheel body so that entrapped air may freely transfer within the wheel body from the trapped pocket to other radial openings beyond the confines of the area against which the work body is in contact; and in Figure 7 the peripheral portions of the sheet metal wheel elements are corrugated or formed alternately to one side of the plane of the sheet metal blank and to the other side of such plane, so as to carry such sheet metal past the radial openings; and in this figure the successive wheel sections are so located on the axis of rotation that the half opening of one section registers with the half opening of the adjacent section, etc., thus producing the full round openings or passages by use of semi-circular openings or passages formed in the sections; and Figure 8 shows a fragmentary section taken on the line 8—8 of Figure 7, looking in the direction of the arrows.

Referring first to Figures 1 and 2, the wheel there shown is mounted on the arbor 10, the end 11 of such arbor being suitably journalled by a journal not shown. A flange 12 is provided on that portion of the arbor adjacent to such journal. The body of the wheel comprises a series of identical sheet metal circular elements 13ª, 13ᵇ, 13ᶜ, etc., set into the bank comprising the body of the wheel, such elements being faced alternately in one direction and the other as evident from Figure 1. Each of these circular elements is press formed in suitable dies, to provide the circular angled corrugations 14, each corrugation extending in circular fashion around the element, and in the form shown there are provided four of these circular corrugations in each element. At the inner or axial portion each circular element is provided with a circular reinforcing ring 15, and the inner portion of the sheet metal of such element is carried inward over the face of such ring 15, and is formed axially within such ring, as clearly evident in Figure 1, to produce the inside axially extending flange 16. When the elements 13 are all assembled together these flanges 16 come into registry to form a substantially continuous tubular inner opening for the assembled elements.

It is noted that the corrugations are angled so as to provide the radially extending circular faces such as shown at 17 and 18; and since the elements are identical in form and size it is seen that by alternately reversing the elements as they are brought together during assembly one of the faces 17 of each element will come into facial engagement and registry with the corresponding face 17 of the adjacent element at one side, and that one of the faces 18 of the first mentioned element will come into facial engagement and registry with the corresponding face 18 of the adjacent element at the other side. Thus, as the wheel is built up the faces 17 of successive elements will come into facial engagement with corresponding faces 17, and the faces 18 of successive elements will come into facial engagement with corresponding faces 18. By good production operations it is thus possible to ensure production of a wheel assembly in which the cross-section of the interior will resemble a honeycomb, as is clearly shown in Figure 1. During the assembling operation the exposed faces 17 and 18 are treated to suitable bonding agent such as for example, nitro-cellulose metal bonding cement of the B. F. Goodrich Company, or other suitable bonding agent. Then, when such bonding agent has firmly "set" the successive sections of the wheel will be secured together into a substantially solid honeycomb of sheet metal, of great strength and rigidity, and ability to withstand deforming forces much greater than may ever be expected to occur in the usual operation and use of such a wheel.

Prior to such assembly and bonding together of the elements 13, I form and produce on the peripheral portion of each of them the peripheral section 19 of rubber or neoprene, or other suitable material, generally elastic. Examination of Figure 1 shows that the peripheral portion of each of the elements 13 extends into and is bonded to the portion 19, such result being secured by properly forming the rubber or other material over such peripheral flange portion during such operation. Preferably, also, the flange portion of each element 13 is provided with regularly spaced through openings 20, as best shown in Figure 8, such openings being in position such that the rubber or other material is formed and moulded directly through such openings, thus effectively bonding the peripheral portion 19 to the element 13. As shown in Figure 8, also there are provided two rows of these openings, located at different radii, so that even a firmer bonding action is produced between the parts. It is also noted from Figure 1 that each of these peripheral portions 19 is located directly radially outwardly from the central plane of the sheet metal element 13, such result being ensured by forming the flange 21 of the element 13 within such central plane, and by causing such flange to extend into the central plane of the peripheral portion 19. Thus, when the several wheel sections are brought together the side faces of the portions 19 will come into facial engagement, such portions 19, being of proper axial dimension to secure this result. During the assembling operation these side faces may be treated with nitro-rubber, or with Hy-car, or with other suitable material to ensure the desired bonding action between the elements 19. Thus the peripheral portion of the assembled wheel will comprise a substantially solid body of elastic material of the selected composition, elasticity, and degree of softness.

Evidently, the peripheral portion may also be made of composition or stuffed materials, having that degree of abrasiveness which it may be desired to secure, and I do not intend to limit myself, as far as the material from which this peripheral portion is made, except as I may do so in the claims to follow.

The elements 19 may also be formed with suitable irregularities in peripheral contour during the moulding or forming operation, so that when the various wheel sections have been assembled together there will be produced any desired exterior surface contour or irregular or regular design. Thus, in Figures 4 and 5 I have shown exterior surface formations including the cross-wise extending grooves 22, formed, as there shown, at an angle of substantially forty five degrees to the plane which lies parallel to such elements 19. These grooves are shown as extending only partly radially through the elements 19, so that the inner portions of the elements 19 may be securely bonded to the peripheral portions of the corresponding sheet metal elements 13. The locations of such sheet metal elements are shown in Figures 4 and 5 in dotted lines.

In Figure 4 the successive elements 13 are set together at slightly advanced angular positions, as one advances along the assembled wheel (that is, parallel to the axis of rotation), such relative positions being such as to bring the grooves of the successive sections 13 into register with each other, thus producing the continuous groove arrangement shown in Figure 4. In Figure 5, however, the successive elements 13 are set into such relative positions that individual pockets or depressions are formed in the wheel's surface. Evidently, many other specific forms and arrangements of assembly might be used as desired by the operator.

In Figure 7 I have shown a modified form of irregularities in the peripheral surface of the wheel. In this case I have shown the radially extending openings 23 formed in the portion 19 of each section, these openings reaching completely through the portion 19 to the interior or body of the wheel at the location of the sheet metal elements 13. These openings are shown as being located adjacent to the central plane of the portion 19. Accordingly, these openings come into alignment with the central planes of the sheet metal elements 13, thus also coming into registry with the flanged portions of the elements 13. Accordingly, I have in Figure 7 shown the flange portions of the elements 13 as being deflected first to one side and then to the other to avoid the openings of such sections, the flange portion of the sheet metal thus presenting generally a corrugated appearance as clearly shown in Figure 7. Then when the successive sections are brought together there are produced the circular openings as shown in Figures 7 and 8. Since these openings are in the nature of tubular passages extending radially through the peripheral portion of the wheel, it is evident that when the elastic material is deformed by inward compression any trapped air may move to the interior of the wheel. Since the inner ends of all of these passages communicate with the interior of the body of the wheel it is evident that no compression of trapped air will occur, and that, as the wheel rotates, with corresponding continuous shift of the location of compression of the wheel peripheral portion, the trapped air will circulate in and out of these many passages. Thus, too, a cooling and venting action will be produced during the wheel operation.

The cylindrical opening or passage through the central portion of the assembled wheel is set onto the arbor or spindle 10 as already mentioned. When the interior diameter of the wheel opening is the same as the diameter of such spindle it is evident that no lining or other adapter is needed to ensure proper registry. However, when the spindle is smaller than the wheel opening I have provided an adapter in the form of the circular U-cross-section elements or rings 24. These are then set onto the arbor or into the wheel opening during the operation of setting the wheel on the arbor.

Preferably the end plates 25 and 26 are set against the outer or end faces of the assembled group of the sections of the wheel. One of these end plates sets against the flange 12. The lock nut 27 is then threaded against the outer face of the other end plate 26 to thus lock the wheel assembly to the spindle or arbor. Preferably the outer peripheral portions of these end plates are relieved as shown in Figure 1 and come into direct engagement with the inner annular portions of the outer portions 19. Thus the elastic elements are securely locked at their inner radial portions by such pressure at it may be desired to develop by the axial compressing action of the nut 27. It is to be noted, however, that generally this compressing action against the portions 19 will be comparatively small, and that the end thrust will be taken up by the annular rings 15 set into the central portions of the elements, and to which I have previously referred.

It is now noted that by so designing the sizes of the angled corrugations 14 that they are of equal dimension radially, it is possible to effect changes in the sizes of the sheet metal plates to be formed by use of a properly designed die, by the following procedure:

Assuming, for example, that each of these angled corrugations is of one inch radial dimension, and by forming the die to include one or more removable rings or ring elements, such die can be used for production of the sheet metal elements of progressive sizes, by changes of two inches diameter between extreme maximum and minimum diameters. Each change of size would be produced by insertion or removal of one ring element of the die, such ring element having a radial dimension of one inch and including die formations to produce one of the corrugations. Thus the design of sectionalized wheel herein disclosed lends itself to production in a number of regularly progressive sizes by addition or subtraction of one or more of the angular corrugations, and without other change in the design of the wheel. Thus the desired selection of wheel sizes may be produced by use of a minimum amount and investment of die equipment.

Examination of Figure 8 shows that the through openings 23 are of smaller diameter in their small radius ends than their outer or large radius ends. Accordingly the amount of rubber or other elastic material removed from the inner radius portion of the elastic portion 19 is smaller than it would have been had these holes been of uniform diameter throughout their entire radial dimension. This is an important feature since the centrifugal forces developed during wheel running are large, and the stretching effects produced by such centrifugal forces are correspondingly large. These stretching forces must be resisted by the body of the material contained in such portion 19, and this body of material is substantially increased by use of the design feature just referred to.

I claim:

1. A sectional wheel comprising in combination a plurality of substantially identical circular disk shaped sheet metal elements each including a central spindle receiving opening, a spindle extending through the openings of all of said elements, each element being of formation including a series of concentric corrugations of progressively larger radii measured from the spindle axis, all of said corrugations of each disk shaped element being of the same depth measured in direction parallel to the spindle axis and being provided with circular flat faces at the central portions of the corrugations, all of said flat faces at each side of each disk lying in a common plane normal to the axis of spindle rotation, the disk elements being mounted on the spindle with the several flat faces of the successive disk elements in registering facial engagement with each other, ring shaped bodies of elastic material secured to the peripheral portions of the several disk elements, said ring shaped bodies having radially flat faces and said bodies being of axial dimension to ensure facial engagements of the adjacent faces of successive bodies with each other when the flat faces of the corrugations of the successive disk elements are in engagement with each other, together with means in connection with the spindle to prevent displacement of the disk elements away from each other in axial direction.

2. A wheel structure as defined in claim 1, together with bonding material bonding together the facial flat faces of the successive disk elements which faces are in engagement with each other.

3. A wheel structure as defined in claim 1, together with bonding material bonding together the radially flat faces of the bodies of elastic material which faces are in facial engagement with each other.

4. A wheel structure as defined in claim 2, together with bonding material bonding together the radially flat faces of the bodies of elastic material which faces are in facial engagement with each other.

5. A wheel structure as defined in claim 1, wherein the peripheral portions of the disk elements are radially flat and are located centrally of said disk elements measured in an axial direction, and wherein the said radially flat disk portions are embedded within the smaller radius portions of the ring shaped elastic bodies.

6. A wheel structure as defined in claim 1, wherein the ring shaped bodies of elastic material are provided with regularly recurring irregularities in their outwardly facing surfaces.

7. A wheel structure as defined in claim 6, wherein said irregularities comprise axially extending grooves in the elastic bodies.

8. A wheel structure as defined in claim 7, wherein said grooves are non-parallel to the axis of rotation of the wheel.

9. A wheel structure as defined in claim 6, wherein said irregularities comprise radially extending openings extending radially through the dimensions of the elastic bodies.

10. A wheel structure as defined in claim 9, wherein said radially extending openings are semi-circular in cross-section, and wherein each such opening has its diameter in registry with one of the radially flat faces of such elastic body.

11. A wheel structure as defined in claim 10, wherein the semi-circular radially extending openings of adjacent elastic bodies register with each other to provide circular radially extending openings.

12. A wheel structure as defined in claim 1, together with ring shaped elements of larger size than the spindle located between the small diameter portions of the successive disk elements, said ring shaped elements being of axial dimension substantially equal to the axial dimension of the corrugations of the disk elements, and said ring shaped elements comprising compression resisting elements intermediate between the small diameter portions of the successive disk elements.

13. A wheel structure as defined in claim 1, together with end plates located adjacent to the endmost disk elements and in engagement with the small radius portions of said disk elements.

14. A wheel structure as defined in claim 13, wherein said end plates are provided with peripheral portions overlapping the small radius portions of the elastic bodies and in supporting engagement therewith.

15. A wheel structure as defined in claim 12, wherein said ring shaped elements are of internal size greater than the external size of the spindle to provide an annular space between the internal surfaces of the ring shaped elements and the external surface of the spindle, together with spacer ring elements occupying said annular space.

16. A wheel structure as defined in claim 15, wherein said spacer ring elements are of channel shaped cross section.

References Cited in the file of this patent

UNITED STATES PATENTS 1,420,097    Harvey  ---------------  June 20, 1922